Nov. 26, 1957 — H. A. PAULSEN — 2,814,797
ELECTRIC SIGNAL DEVICE
Filed Nov. 15, 1954
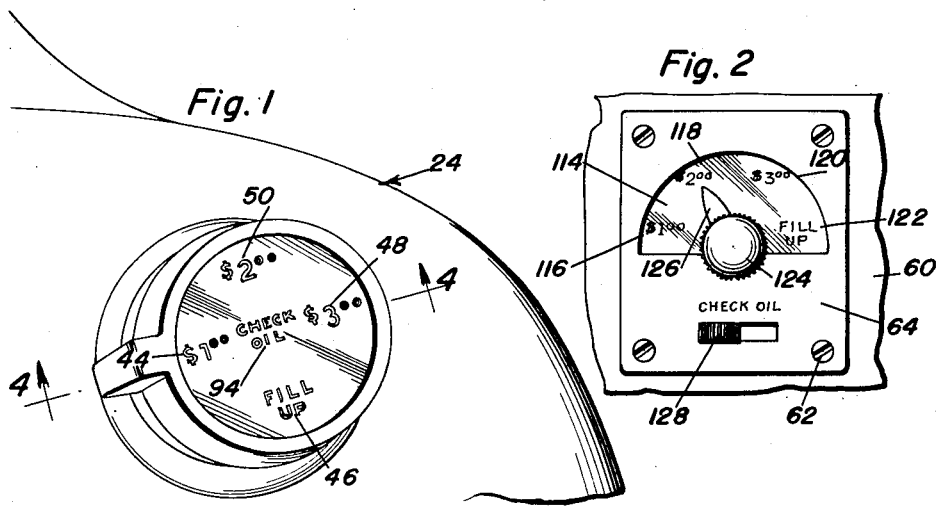
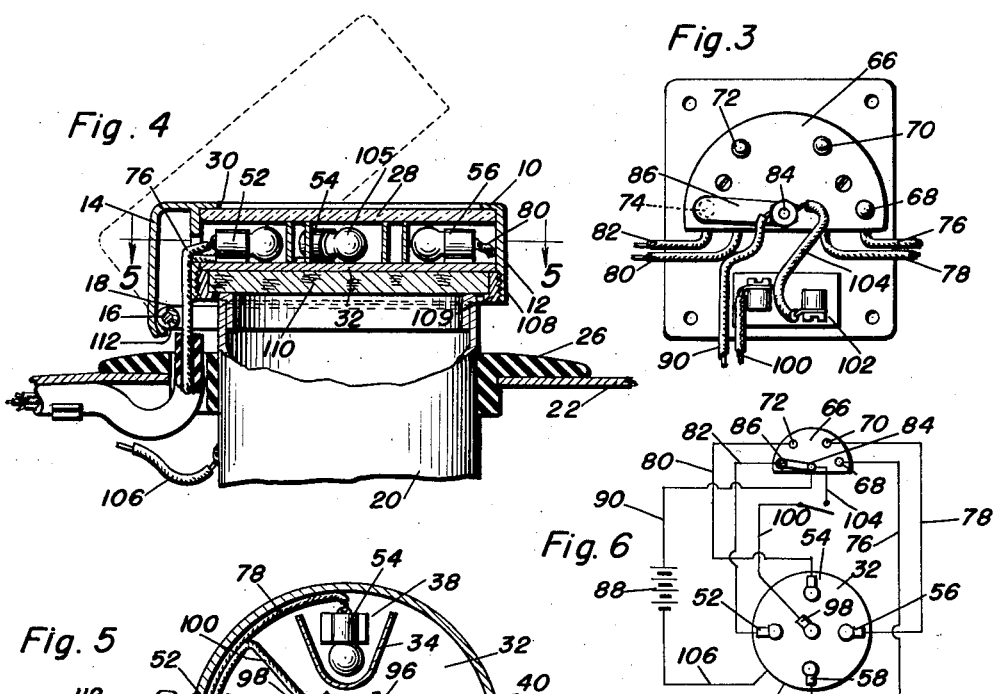
Harold A. Paulsen
INVENTOR.

United States Patent Office 2,814,797
Patented Nov. 26, 1957

2,814,797
ELECTRIC SIGNAL DEVICE
Harold A. Paulsen, Zumbrota, Minn.
Application November 15, 1954, Serial No. 468,873
2 Claims. (Cl. 340—332)

This invention relates to new and useful improvements in signal devices and the primary object of the present invention is to provide an electric signal device for vehicles including novel and improved means for indicating to a gasoline station service man the amount of gasoline or service that the driver of the vehicle requests.

Another important object of the present invention is to provide an electric signal device that is applied to the gasoline tank of a vehicle and which is quickly and readily operable by a switch mounted on the dashboard of a vehicle, so that the driver of the vehicle may inform the service man the type of service he requires without having to exit from the driver's seat.

A further object of the present invention is to provide an electric signal device applicable for the gasoline tanks of vehicles that is small and compact in structure and which may be quickly and readily applied to and removed from its applied position in a convenient manner.

A still further aim of the present invention is to provide an electric signal device that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a vehicle and showing the cap portion of the present invention applied to the gasoline tank inlet conduit thereof;

Figure 2 is a fragmentary front elevational view of a vehicle dashboard, and showing the switch mechanism employed in conjunction with the present invention applied thereto;

Figure 3 is a rear elevational view of the switch mechanism used in conjunction with the present invention;

Figure 4 is a sectional view taken substantially on the plane of section line 4—4 of Figure 1;

Figure 5 is a sectional view taken substantially on the plane of section line 5—5 of Figure 4; and Figure 6 is a schematic diagram showing the electrical circuit used in conjunction with the present invention.

Referring now to the drawings in detail, wherein for the purpose of illustration, there is disclosed a preferred embodiment of the present invention, the numeral 10 represents an annular cap having a circular flanged portion 12 and an outwardly projecting spring housing 14 that is pivoted by a pin 16 to a pair of spaced parallel ears 18 which are suitably secured to the fuel inlet conduit 20 of a vehicle gasoline tank (not shown). This conduit 20 is supported relative to the fender 22 of a vehicle 24 by a resilient collar or support element 26.

Frictionally positioned in the cap 10, is a circular, opaque stencil plate 28 that opposes an annular opening 30 provided in the cap 10. Slidably positioned in the cap 10, is an annular support plate 32 to which there is fixedly secured a plurality of circumferentially spaced arcuate walls or U-shaped reflecting strips 34 that define a plurality of light chambers 36, 38, 40 and 42 which are interposed between the stencil plate 28 and a support plate 32. These chambers 36, 38, 40 and 42 oppose suitable spaced groups of light admitting indicia, 44, 46, 48 and 50 that are provided on the plate 28 which may be in the form of cut-outs or which may be of translucent or transparent material.

Rigidly secured on the support plate 32 is a plurality of light bulb supporting sockets 52, 54, 56 and 58, one of which is disposed in each of the chambers 36, 38, 40 and 42.

Removably secured to the dashboard 60 of the vehicle 24 or on some other suitable supporting element of the vehicle conveniently accessible to the driver of the vehicle, by fasteners or the like 62, is a base plate 64 supporting a removable switch mechanism 66 on its rear face. This switch mechanism 66 includes a plurality of spaced contact tips 68, 70, 72 and 74 which are connected by wires 76, 78, 80 and 82 to the respective sockets 52, 54, 56 and 58. Rotatably carried by the switch mechanism 56, is a transverse, rotatable actuating pin 84 that removably supports a conductive finger 86 on one end that is adjustable or movable to engage the contact tips 68, 70, 72 and 74, one at a time. This finger 86 is connected to a suitable source of current such as a battery 88 by a conductive wire 90.

Fixed on the center of the support plate 32 and interposed between the plates 28 and 32, is an arcuate central wall 92 that opposes the indicia 94 on the central portion of the stencil plate 28. Mounted in the chamber 96 provided by the wall 92, is a socket 98 that is connected to a conductive wire 100 leading from the cap 10 to a further switch mechanism 102 that is connected by a further wire 104 to the conductive finger 86 for circuit opening and closing movement.

The sockets 52, 54, 56, 58 and 98 are grounded to the plate 32, support suitable bulbs 105 and the battery 88 is grounded by wire 106 to the conduit 20.

Removably engaging threads 108 provided in the cap 10, is a retaining ring 109 that frictionally retains an insulating and sealing disk 110 positioned against the plate 32.

It should be noted, that a coil spring 112 is mounted on the pivot pin 16 and has its ends fixed to the housing 14 and one of the ears 18, for normally retaining the cap in a closed position relative to the conduit 20.

In practical use of the device, a plate 114 is fixed to the outer face of the plate 64 and is provided with indicia 116, 118, 120 and 122 that corresponds to the indicia 44, 50, 48 and 46. A finger engaging knob 124 and pointer 126 is fixed on the pin 84 for rotating the latter, so that when the pointer 126 opposes a selected indicia on plate 114, for example, indicia 118, the contact finger 86 will engage the tip 70 completing the circuit from the battery to tip 70 and hence to the socket 54 whereby the bulb supported by socket 54 will be illuminated to reflect light through the indicia 50.

To illuminate the indicia 94 on the plate 28, the slide button portion 128 of the switch 122 is pushed in one direction thereby completing the circuit from the battery 88 to the socket 98 and thus energizing the bulb supported by socket 98 which will reflect light through the indicia 94 provided on the said plate 28.

Obviously, the indicia shown may be suitably varied to include a larger number of indicating numerals or words and the number of chambers and light bulb holding sockets may be increased or decreased to correspond to the indicia used, without deviating from the scope of the present invention.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. An electric signal device for vehicles comprising a gasoline tank engaging cap, said cap including a circular internally threaded cylindrically flanged portion, hinge means hingedly securing said cap to the inlet conduit of the gasoline tank, a stencil plate carried by said cap having spaced groups of indicia for indicating the amount of fuel to be placed in the tank, an annular support plate carrying a plurality of reflecting strips dividing said cap into a plurality of chambers, a retaining ring threadedly secured in said cap holding said support plate in alignment with said stencil plate, one of each of said chambers opposing each group of indicia on the stencil plate, a light bulb mounted in each chamber, and switch means mountable on the dashboard of a vehicle for actuating each of said light bulbs independently of each other.

2. An electric signal device for vehicles comprising a gasoline tank engaging cap, said cap including a circular internally threaded cylindrically flanged portion, hinge means hingedly securing said cap to the inlet conduit of the gasoline tank, a stencil plate carried by said cap having spaced groups of indicia for indicating the amount of fuel to be placed in the tank, an annular support plate carrying a plurality of reflecting strips dividing said cap into a plurality of chambers, a retaining ring threadedly secured in said cap holding said support plate in alignment with said stencil plate, one of each of said chambers opposing each group of indicia on the stencil plate, a light bulb mounted in each chamber, and switch means mountable on the dashboard of a vehicle for actuating each of said light bulbs independently of each other, said hinge means including a clamp engageable about the inlet conduit, ears on said clamp, a spring housing affixed to said cap, and a pin hingedly securing said housing to said ears.

References Cited in the file of this patent
UNITED STATES PATENTS

| | | |
|---|---|---|
| 655,264 | Nichol | Aug. 7, 1900 |
| 1,489,818 | Cinquini | Apr. 8, 1924 |
| 1,871,527 | Hurley | Aug. 16, 1932 |
| 1,905,568 | Radke | Apr. 25, 1933 |
| 2,254,569 | Genda | Sept. 2, 1941 |
| 2,634,406 | Jones | Apr. 7, 1953 |